UNITED STATES PATENT OFFICE.

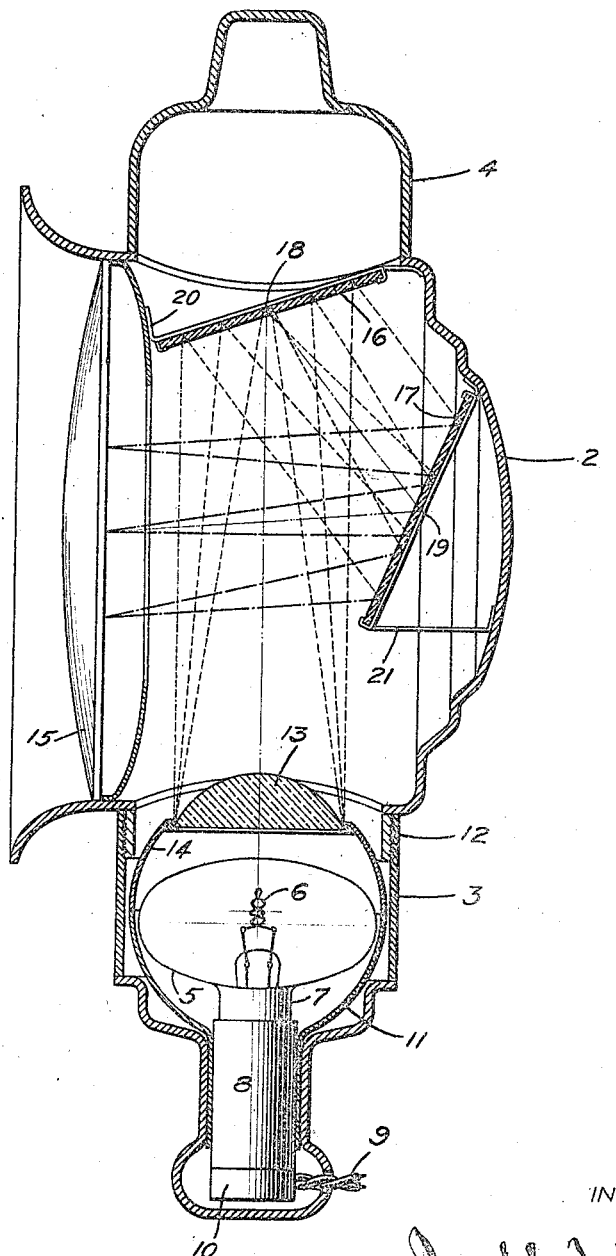

JOSEPH T. ROFFY, OF NEW YORK, N. Y., ASSIGNOR TO A K-RAY CORPORATION, A CORPORATION OF NEW YORK.

PROJECTION-LANTERN.

1,159,419.

Specification of Letters Patent.

Patented Nov. 9, 1915.

Application filed January 6, 1913. Serial No. 740,377.

*To all whom it may concern:*

Be it known that I, JOSEPH T. ROFFY, a subject of the Emperor of Austria-Hungary, and a resident of New York, in the county of New York and State of New York, have made a new and useful Invention in Projection-Lanterns, of which the following is a specification.

This invention relates to projection lanterns; an object being to provide a lantern capable of being used as a side light or lantern for motor vehicles and which will project a cone shaped beam of light having a sharply defined edge and an even field. This, as well as other objects which will readily appear to those skilled in this particular art, I attain in the device described in the specification and illustrated in the single sheet of drawings accompanying the same and forming a part of the application.

In order to obtain a cone shaped beam of light having a sharply defined edge and an even field, it is necessary so far as I know to produce a substantially achromatic beam. When an achromatic beam is used on a motor vehicle for road illumination, it will be desirable to so project the beam that the upper line from the apex to the periphery of the cone of light will either be parallel with the road or will incline slightly from the apex toward the road. If this upper line is kept parallel with the road or slightly inclined toward the road from the apex and the lantern is placed at the usual height now common no objectionable glare will be discernible.

For the purposes of this application when I speak of an achromatic beam of light I mean a beam produced by the projection of the image of a highly luminous and even field. For this purpose I utilize a condensing lens of extremely short focus and therefore wide angle and within the focus of this lens I place a concentrated light source (preferably a coiled tungsten filament). The condensing lens, therefore, becomes the highly luminous field. In conjunction with the condensing lens I utilize a projection lens and this I place in the plane of the inverted image-formation of the concentrated light source. I utilize a projection lens of a curvature such that the condensing lens will lie slightly within the focus of the projection lens. The relative foci and diameters of the condensing and projection lenses will be such that the field on the road (supposing the device used for motor vehicle illumination) will be sufficiently large and intense.

In order to obtain an achromatic beam suitable for use in a projection lantern for motor vehicles, it is necessary that the device for producing the achromatic beam should be compact and relatively cheap. In order to use a condensing lens of small diameter and wide angle it has been necessary for me to design a special incandescent lamp (and by this I mean one with a high candle power filament approaching as near as possible a geometric point in size) by means of which I obtain a concentrated light source within the focus of the condensing lens.

In making up an achromatic set for use as a lantern for motor vehicles a number of things have to be taken into consideration. The lenses must be comparatively cheap; the electric current consumed for the light obtained must be relatively low, and the size of the device must be comparatively small.

For use with my achromatic set I have produced an electric light or bulb which will have sufficient effective life for the purpose in hand. I preferably make use of a tungsten filament coiled so as to produce a light source of sufficient candle power concentrated to a small area. The outer tip of the filament coil I bring relatively near the top of the bulb ($\frac{1}{4}''$ I find satisfactory). Since in the coil of filament a magnetic field is set up, the metal particles (ions) are driven off at right angles to the axis of the coil and are not deposited on the top of the bulb. In order to bring the light source within the focus of the condensing lens it is necessary to place the bulb close to the lens. In order to obtain relatively long life to the filament I extend the bulb at right angles to the axis of the filament a considerable distance (about one inch on either side) so that the bulb assumes a mushroom shape. The leads are taken off through the bottom at its center and the tip left after blowing is placed so as not to fall within the angle from the center of the filament to the circumferential edge of the lens. By thus increasing the distance to the portion of the bulb at right angles to the filament axis the amount of deposit from the filament on any portion of the bulb is reduced and by thus flattening the bulb its top assumes a curvature closely conforming to the contour of the plane face of the condensing lens adjacent thereto, which is advantageous.

For the purpose of clearly illustrating this invention but without any desire to limit the same I have chosen one certain form of lantern and into this I have incorporated an achromatic set embodying this invention.

The figure of the drawing is a view in sectional elevation of a lantern embodying this invention.

The lantern consists of a housing made up of a central portion 2, a bottom portion 3, and a top 4. Within the bottom portion a mushroom shaped globe 5 containing a coiled tungsten filament 6 is supported by having its base 7 secured within a socket 8 supported in the bottom portion 3. The terminals 9 for the bulb are taken out through the fiber block 10 forming a part of the socket. A semi-spherical reflector 11 is located in the bottom portion 3 of the housing and surrounds the bulb 5. The bottom portion 3 of the housing is preferably screw-threaded as at 12 to the body portion 2. A plano-convex lens 13 (which I term the condensing lens) is supported within the bottom part of the body portion and in such relation to the filament 6 of the incandescent bulb that said filament lies within the focus of said lens. A reflector 14 corresponding to the spherical reflector 11 completes the sphere from reflector 11 to said lens 13, the two reflectors 11 and 14 being formed on the same radius around filament 6.

At the front of the body portion 2 of the lamp a plano-convex lens 15 (which I term the projection lens) is supported and two plane mirrors 16 and 17 are arranged within the body portion 2 so as to reflect the light rays from lens 13 to lens 15. By way of explanation, if the focal distance between lens 13 and lens 15 is 8¼", mirrors 16 and 17 will be arranged so that the total distance from the center of the convex face of lens 13 to the center 18 of mirror 16, then to the center 19 of mirror 17, and thence to the center of the plano face of lens 15, will be 8¼". Mirrors 16 and 17 are preferably circular and are secured to the housing by means of supports 20 and 21 respectively.

Having thus described my invention, what I claim is:

1. The combination with a lens of the condensing variety, of an incandescent lamp having a concentrated light source within the focus of said lens, an objective lens, and plane mirrors arranged in the path of the light rays between said lenses arranged to reduce the linear distance while maintaining the focal distance between the lenses.

2. The combination with a lens, of a concentrated light source within the radius of curvature of said lens, an objective lens, and means within the path of the light rays between said lenses arranged to reduce the linear distance while maintaining the focal distance between said lenses.

3. The combination with a lens of the condensing variety, of a concentrated light source within the radius of curvature of said lens, a spherical reflector behind said light source, an objective lens, and means in the path of the light rays between said lenses arranged to reduce the linear distance while maintaining the focal distance therebetween.

4. The combination with a lens of the condensing variety, of a lamp having a concentrated light source within the focus of said lens, an objective lens and two mirrors arranged so as to bring said lenses in optical relation one with the other and to reduce the linear distance between the lenses.

5. The combination with a lens of the condensing variety, of a lamp having a concentrated light source within the focus of said lens, an objective lens and means in the path of the light rays between said lenses, said means being arranged to reduce the linear distance while maintaining the focal distance between said lenses.

In testimony whereof, I have hereunto subscribed my name this 2nd day of January, 1913.

JOSEPH T. ROFFY.

Witnesses:
F. DAVIS,
ANNA CLOHERTY.